(12) United States Patent
Ogawa

(10) Patent No.: US 12,189,220 B2
(45) Date of Patent: Jan. 7, 2025

(54) OPTICAL MODULATION ELEMENT

(71) Applicant: Fujitsu Optical Components Limited, Kawasaki (JP)

(72) Inventor: Kensuke Ogawa, Meguro (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 265 days.

(21) Appl. No.: 17/701,201

(22) Filed: Mar. 22, 2022

(65) Prior Publication Data

US 2022/0244582 A1 Aug. 4, 2022

Related U.S. Application Data

(63) Continuation of application No. PCT/JP2020/035537, filed on Sep. 18, 2020.

(30) Foreign Application Priority Data

Oct. 4, 2019 (JP) ................................. 2019-183556

(51) Int. Cl.
*G02F 1/00* (2006.01)
*G02F 1/015* (2006.01)
*G02F 1/025* (2006.01)

(52) U.S. Cl.
CPC ............. *G02F 1/025* (2013.01); *G02F 1/0081* (2013.01); *G02F 1/015* (2013.01); *G02F 1/0152* (2021.01); *G02F 2201/063* (2013.01); *G02F 2203/50* (2013.01)

(58) Field of Classification Search
CPC ...... G02F 1/0081; G02F 1/015; G02F 1/0152; G02F 1/025; G02F 2201/063; G02F 2203/50
See application file for complete search history.

(56) References Cited

U.S. PATENT DOCUMENTS

| 6,385,360 | B1 | 5/2002 | Kambe |
| 6,787,805 | B1 | 9/2004 | Takizawa et al. |
| 7,397,101 | B1* | 7/2008 | Masini ................. G02B 6/4295 |
| | | | 257/656 |

(Continued)

FOREIGN PATENT DOCUMENTS

| JP | 2000-66157 | 3/2000 |
| JP | 2008-103392 | 5/2008 |

(Continued)

OTHER PUBLICATIONS

Office Action, dated Jan. 4, 2023, in corresponding Japanese Patent Application No. 2021-550629 (9 pp.).

(Continued)

*Primary Examiner* — Ryan A Lepisto
(74) *Attorney, Agent, or Firm* — STAAS & HALSEY LLP

(57) ABSTRACT

An optical modulation element 100 includes a rib type optical waveguide that includes a rib portion 112 that has a P-N junction, a P-type slab area 114 that continuously extends from a P type area of the rib portion 112, and an N-type slab area 116 that continuously extends from an N type area of the rib portion 112. A first thin film 130 is formed on the P-type slab area 114 and is made of a material having an electron affinity that is different from that of the P-type slab area 114.

5 Claims, 5 Drawing Sheets

(56) References Cited

U.S. PATENT DOCUMENTS

| | | | |
|---|---|---|---|
| 8,693,811 B2* | 4/2014 | Morini | G02F 1/025 |
| | | | 438/106 |
| 9,207,469 B2* | 12/2015 | Yang | G02F 1/025 |
| 9,425,899 B2* | 8/2016 | Sekiguchi | G02F 1/025 |
| 9,437,759 B2* | 9/2016 | Baehr-Jones | H01L 27/14649 |
| 10,146,070 B2* | 12/2018 | Fujikata | G02F 1/025 |
| 10,374,118 B2* | 8/2019 | Alloatti | H01L 31/1105 |
| 10,546,963 B2* | 1/2020 | Hon | H01L 31/103 |
| 11,054,675 B2* | 7/2021 | Fujikata | G02F 1/015 |
| 11,105,974 B2* | 8/2021 | Alloatti | G02B 6/12004 |
| 2010/0060970 A1 | 3/2010 | Chen | |
| 2015/0016769 A1* | 1/2015 | Verma | G02B 6/12004 |
| | | | 438/69 |
| 2015/0293384 A1* | 10/2015 | Ogawa | G02F 1/2257 |
| | | | 385/11 |
| 2016/0233379 A1 | 8/2016 | Qin et al. | |
| 2016/0313577 A1* | 10/2016 | Sun | G02F 1/025 |
| 2016/0370607 A1* | 12/2016 | Akiyama | G02F 1/0121 |
| 2017/0102564 A1 | 4/2017 | Sakamoto et al. | |
| 2018/0348430 A1 | 12/2018 | Ogawa | |
| 2020/0301177 A1 | 9/2020 | Fujikata et al. | |
| 2020/0313021 A1* | 10/2020 | Fujikata | H01L 31/035281 |

FOREIGN PATENT DOCUMENTS

| | | |
|---|---|---|
| JP | 2014-36210 | 2/2014 |
| JP | 2014-126728 | 7/2014 |
| JP | 2016-536806 | 11/2016 |
| JP | 2017-72808 | 4/2017 |
| JP | 2018-146736 | 9/2018 |
| JP | 2018-205459 | 12/2018 |
| JP | 2019-49612 | 3/2019 |
| WO | WO00/79601 | 12/2000 |

OTHER PUBLICATIONS

J-H. Han, F. Boeuf, J. Fujikata, S. Takahashi, S Takagi, and M. Takenaka, "Efficient low-loss InGaAsP/Si hybrid MOS optical modulator," Nature Photonics vol. 11, pp. 486-490 (2017).

J. Zhou et al., "Silicon Photonics Carrier Depletion Modulators Capable of 85Gbaud 16QAM and 64Gbaud 64QAM", Optical Fiber Communication Conference 2019 (3 pp.).

International Search Report, dated Dec. 15, 2020, in corresponding International Application No. PCT/JP2020/035537 (6 pp.).

Written Opinion of the International Searching Authority, dated Dec. 15, 2020, in corresponding International Application No. PCT/JP2020/035537 (8 pp.).

Chinese Office Action dated Jul. 29, 2024 in corresponding Chinese Patent Application No. 202080067867.2.

\* cited by examiner $\tau = 2RC$

OPTICAL MODULATION ELEMENT

CROSS-REFERENCE TO RELATED APPLICATIONS

This application is a continuation of International Application No. PCT/JP2020/035537, filed on Sep. 18, 2020 which claims the benefit of priority of the prior Japanese Patent Application No. 2019-183556, filed on Oct. 4, 2019, the entire contents of which are incorporated herein by reference.

FIELD

The embodiment discussed herein is related to an optical modulation element.

BACKGROUND

In large-capacity optical networks used in data centers and 5G backhaul, and in a high-speed optical information processing performed in connected cars and autonomous operations, optical networks are used for communication between blocks or data centers that need bands.

As a transceiver of the optical network, optical modulation elements are heavily used for conversion from electrical signals to optical signals, and thus, speeding up and cost reduction of the optical modulation elements become an important issue.

FIG. 1A is a sectional view of a rib type optical waveguide 900 that is used for a related optical modulation element. The rib type optical waveguide 900 includes a core 910, an upper side clad layer 920, and a lower side clad layer 922, both of which sandwiches the core 910. A P-N junction 912 that has a rib type structure is formed at the center of the core 910, and slab areas 914 and 916 are connected on both sides of the P-N junction 912 that has the rib type structure. An electrode is drawn out from each of the slab areas 914 and 916. A DC reverse bias voltage and an alternating voltage that is superimposed on the DC reverse bias voltage are applied between the electrodes. The rib type optical waveguide 900 is able to change a refractive index of the core 910 by controlling the alternating voltage, thereby functioning as a phase shifter (optical modulator).

FIG. 1B is an equivalent circuit diagram of the rib type optical waveguide 900 illustrated in FIG. 1A. The equivalent circuit of the rib type optical waveguide 900 is a series connection circuit in which a capacity C and resistance R are connected in series, and the time constant T is given by Equation (1), where C denotes the capacity of the P-N junction 912, and R denotes a resistance component between a metal electrode and the P-N junction 912.

$$\tau = 2RC \tag{1}$$

Therefore, in order to increase a performance speed of the rib type optical waveguide 900, there is a need to reduce the resistance R and shorten a response time constant τ that is determined by the product RC of the P-N junction capacity C and the resistance component R.

Patent Document 1 discloses a technology for reducing series resistance R by increasing a doping density of each of the slab areas 914 and 916 exhibited on both sides of the P-N junction 912 that has the rib type structure, and by increasing a carrier (free electron or hole) density. According to Non-Patent Document 1, with this technology, optical modulation of the frequency band of 54 GHz is possible.

Patent Document 1: Japanese Laid-open Patent Publication No. 2014-126728
Patent Document 2: Japanese Laid-open Patent Publication No. 2019-049612
Patent Document 3: Japanese Laid-open Patent Publication No. 2017-072808
Non-Patent Document 1: J. Zhou et al., "Silicon Photonics Carrier Depletion Modulators Capable of 85 Gbaud 16QAM and 64 Gbaud 64QAM", Optical Fiber Communication Conference 2019, Page-Tu2H.2
Non-Patent Document 2: J-H. Han, F. Boeuf, J. Fujikata, S. Takahashi, S Takagi, and M. Takenaka, "Efficient low-loss InGaAsP/Si hybrid MOS optical modulator," Nature Photonics Vol. 11, pp. 486-490, 2017

In the technology described in Patent Document 1, a doping concentration (carrier density) in a slab area is increased by a factor of four. As a result, optical absorption due to free carriers is increased by about 30%. In other words, in the technology described in Patent Document 1, a relationship between an increase in a performance speed and an optical loss is a trade-off relationship. In order to compensate for an increase in an optical loss, there is a need to increase the intensity of incident laser or optical amplification, so that power consumption is consequently increased.

SUMMARY

According to an aspect of an embodiment, an optical modulation element includes: a rib type optical waveguide that includes a rib portion that has a P-N junction, a P-type slab area that continuously extends from a P type area of the rib portion, and an N-type slab area that continuously extends from an N type area of the rib portion; and a first thin film that is formed on the P-type slab area and that is made of a material having an electron affinity that is different from an electron affinity of the P-type slab area.

According to the aspect, dopant is localized in the P-type slab area, and a two-dimensional hall system, that is, a thin electron hole layer, is formed on a first thin film that is in contact with the P-type slab area. Mobility of the two-dimensional hall system is higher than electron/hole mobility of the conventional optical modulation element, so that it is possible to greatly reduce series resistance, and thus, it is possible to implement an increase in a performance speed. Furthermore, high-density free carriers are present in the first thin film, it is possible to prevent an increase in an optical loss in the P-type slab area.

The first thin film may be formed with a gap from a side wall of the rib portion. By providing the gap, it is possible to prevent the light passing through the rib portion from leaking out into the first thin film and the P-type slab area.

The optical modulation element may further include a second thin film that is formed on the N-type slab area and that is made of a material having an electron affinity that is different from that of the N-type slab area. According to the aspect, dopant is localized on the second thin film, and a two-dimensional electron system is formed in the N-type slab area that is in contact with the second thin film. The mobility of the two-dimensional electron system is higher than the electron/hole mobility of the conventional optical modulation element, so that it is possible to greatly reduce series resistance, and thus, it is possible to implement an increase in a performance speed. Furthermore, free carriers are accordingly present in the N-type slab area; however, because the carrier concentration is about the same level as before, the optical loss is also about the same level.

The second thin film may be formed with a gap from the side wall of the rib portion. By providing the gap, it is possible to prevent the light passing through the rib portion from leaking out into the second thin film and the N-type slab area.

The P-N junction of the rib portion may have a horizontal structure. The P-N junction of the rib portion may have a vertical structure.

The rib type optical waveguide may include Si, the first thin film (and the second thin film) may include Ge. As a result, it is possible to easily implement integration of the optical modulation element on a CMOS based platform.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1A:
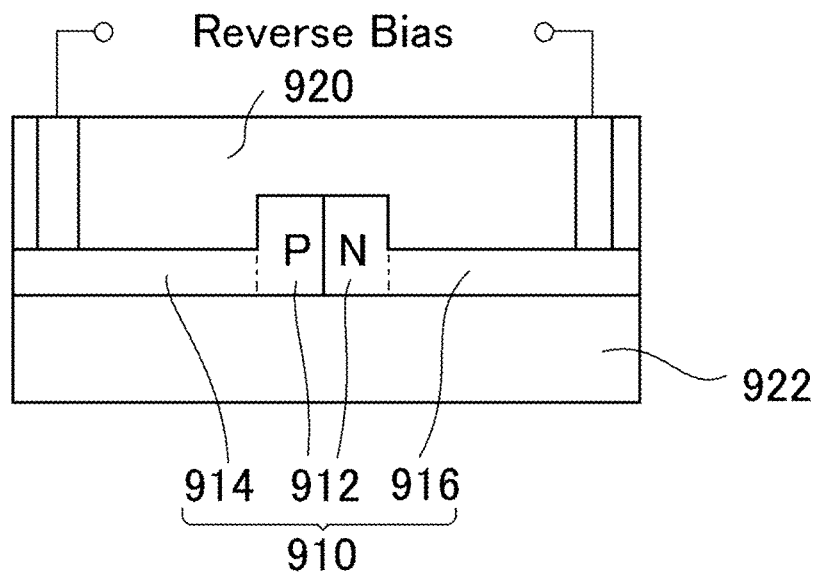
FIG. 1A is a sectional view of a rib type optical waveguide that is used for a conventional optical modulation element.
Figure 1B:
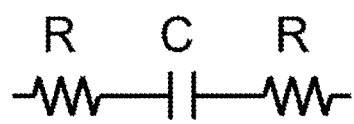
FIG. 1B is an equivalent circuit diagram of the rib type optical waveguide illustrated in FIG. 1A.

Preferred embodiments of the present invention will be explained with reference to accompanying drawings. By assigning the same reference numerals to the same or equivalent components, members, processes illustrated in each of the drawings, and overlapping descriptions thereof will be appropriately omitted. Furthermore, the embodiments are only exemplified and do not limit the present invention, all of the features and combinations described in the embodiments are not always essential to the present invention.

Figure 2:
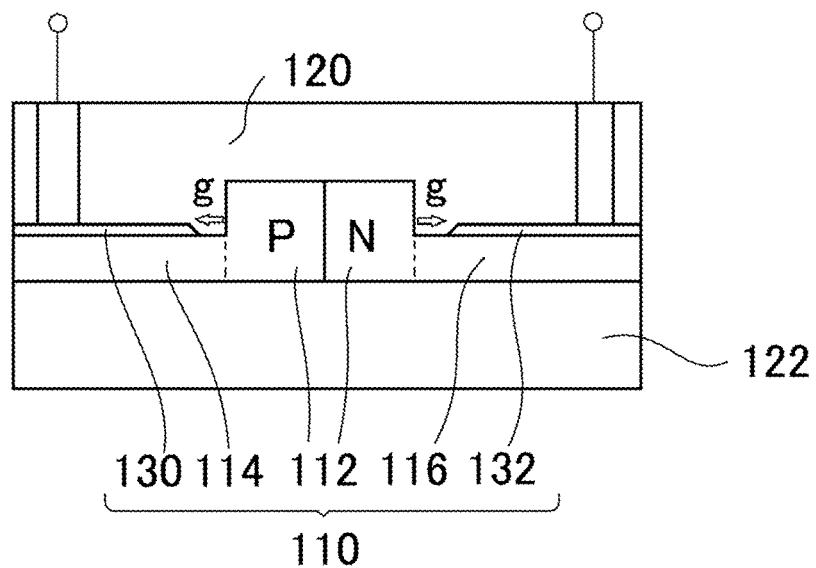
FIG. 2 is a sectional view of an optical modulation element according to an embodiment.

FIG. 2 is a sectional view of an optical modulation element 100 according to an embodiment. The optical modulation element 100 includes a rib type waveguide that has a core 110 having a rib shape, an upper side clad layer 120, and a lower side clad layer 122, both of which sandwiches the core 110.

The core 110 includes a rib portion 112 that has P-N junction having a horizontal structure, a P-type slab area 114 that continuously extends from the P type area of the rib portion 112, and an N-type slab area 116 that continuously extends from the N type area of the rib portion. The core 110 further includes a first thin film 130 and a second thin film 132.

The first thin film 130 is formed on the P-type slab area 114. The first thin film 130 is able to be configured by a semiconductor material having an electron affinity that is exhibited with respect to a hole and that is different from an electron affinity of the P-type slab area 114. The electron affinity of the semiconductor is an energy obtained at the time at which a single piece of electron is moved from an external vacuum level to the bottom of a conduction band in a semiconductor.

The second thin film 132 is formed on the N-type slab area 116. The second thin film 132 is able to be configured by a semiconductor material having an electron affinity that is different from that of the quality of the material of the N-type slab area 116.

For example, in a case of a silicon waveguide, Si is selected for the core 110, whereas $SiO_2$ is selected for a clad. In this case, Ge is preferable for the first thin film 130 and the second thin film 132.

It is preferable that the first thin film 130 be formed with a gap g from the side wall of the rib portion 112 on the P side, and, similarly, it is preferable that the second thin film 132 be formed with the gap g from the side wall of the rib portion 112 on the N side.

As an explanation of an exemplary size of the optical modulation element 100, the width of the rib portion 112 may be set to about 450 to 500 nm, and the height may be set to about 220 to 400 nm. The thickness of each of the P-type slab area 114 and the N-type slab area 116 is preferably be less than or equal to 100 nm. It is preferable that the thickness of the film of each of the first thin film 130 and the second thin film 132 be set to about 30 to 50 nm. Furthermore, the gap between the first thin film 130 and the rib portion 112 in the lateral direction and the gap between the second thin film 132 and the rib portion 112 in the lateral direction is preferably be set to about 100 to 150 nm.

Figure 3:
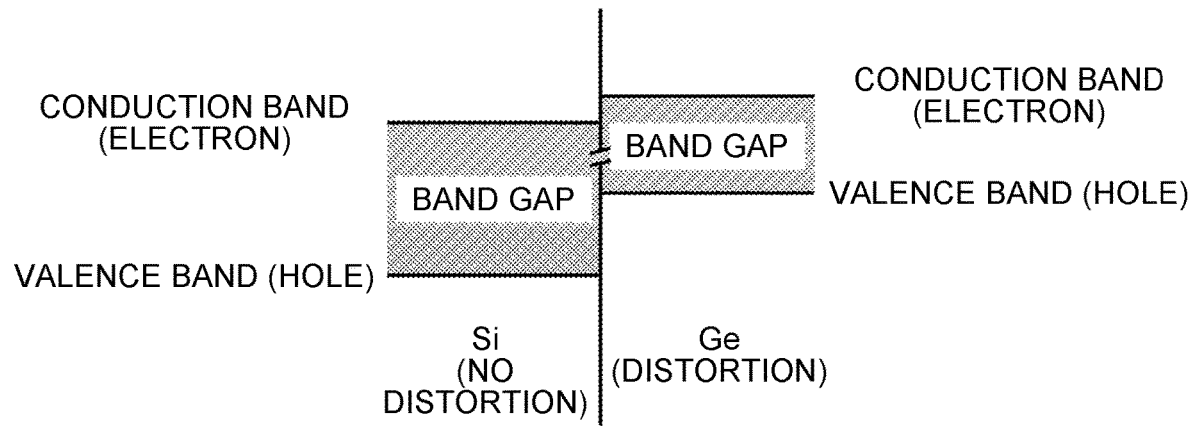
FIG. 3 is a band diagram of a Type II hetero junction between Si and Ge.

The configuration of the optical modulation element 100 has been described above. In the following, an operation of the optical modulation element 100 will be described. On the interfaces of the first thin film 130 and the P-type slab area 114, a hetero junction between Si and Ge is formed. Similarly, on the interface of the second thin film 132 and the N-type slab area 116, hetero junction between Si and Ge is formed. FIG. 3 is a band diagram of the Type II hetero junction between Si and Ge. The band arrangement of the semiconductor hetero junction illustrated in FIG. 3 is caused by a difference in the electron affinity.

Figure 4A:
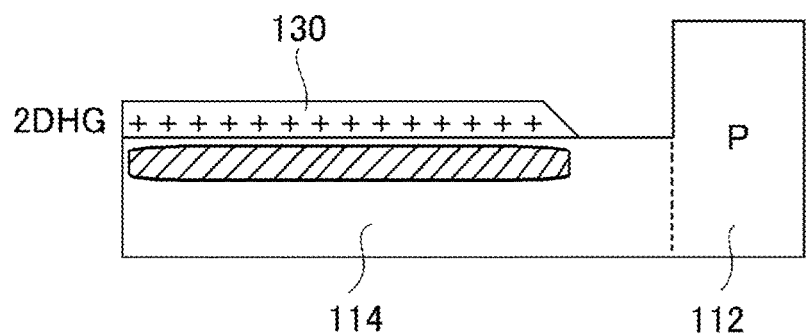
FIGS. 4A and 4B are diagrams each schematically illustrating a distribution of carriers and dopants in each of a P type area and an N type area of the optical modulation element illustrated in FIG. 2.
Figure 4B:
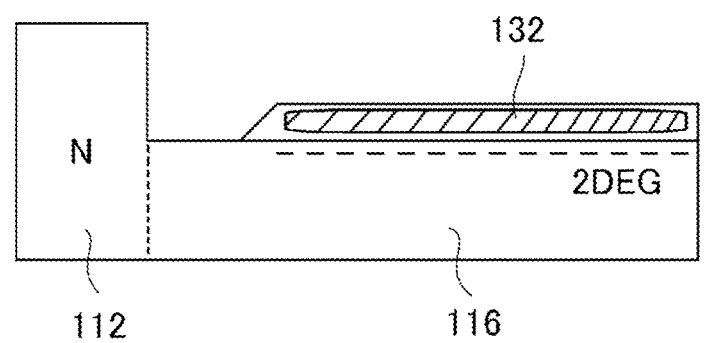

FIGS. 4A and 4B are diagrams each schematically illustrating a distribution of carriers and dopants of each of the P type area and the N type area of the optical modulation element 100 illustrated in FIG. 2.

The state of the P type area will be described with reference to FIG. 4A. At the junction between the first thin film 130 and the P-type slab area 114, dopant ion is localized in the area indicated by the hatching on the P-type slab area 114 side. Then, a two-dimensional hole gas (2DHG) is formed in the first thin film 130 that is isolated from the dopant ion. The mobility of the two-dimensional hole gas is higher than two times the mobility of Si obtained when an acceptor has been doped at a high concentration. As a result, it is possible to increase electric conductivity of the first thin film 130, and thus, it is possible to decrease a resistance value Rp between the electrode and the P-N junction to ½ or less than before.

The state of the N type area will be described with reference to FIG. 4B. At the junction between the second thin film 132 and the N-type slab area 116, dopants are localized in the area of the second thin film 132 indicated by the hatching, and a two-dimensional electron gas (2DEG) is formed in the N-type slab area 116 that is isolated from the area in which the dopants are localized. The mobility of the two-dimensional electron gas is higher than two times the mobility of Si obtained when a donor has been doped at a high concentration. As a result, the electric conductivity of the N-type slab area 116 is increased, and it is possible to decrease resistance Rn between the electrode and the P-N junction to ½ or less than before.

Here, a time constant of the optical modulation element 100 is represented by Equation (2) below.

$$\tau = C \times (Rp + Rn) \quad (2)$$

where C denotes a junction capacity of the P-N junction, Rp denotes a resistance value on the P side, and Rn is a resistance value on the N side. As described above, it is possible to decrease the resistance values Rp and Rn, so that a high speed operation is possible.

In the following, an optical loss of the optical modulation element 100 will be described. Referring to FIG. 4A, high-density free carriers are not present in the P-type slab area 114; therefore, an increase in an optical loss is prevented in the P-type slab area 114. When referring to FIG. 4B, electrons that are free carriers are present in the N-type slab area 116; however, the carrier concentration of the electrons that are present in the N-type slab area 116 is about the same level as that in the related N-type slab area 116, so that the optical loss is also about the same level. As a result, an increase in an optical loss is also prevented in the N type area.

In this way, with the optical modulation element 100 according to the embodiment, it is possible to increase a performance speed while preventing an increase in the optical loss.

The optical modulation element 100 according to the embodiment is compared to the related art described in Japanese Laid-open Patent Publication No. 2014-126728. The resistance in the semiconductor material is in inverse proportion to the product of the mobility p and a carrier concentration n.

$$R \propto 1/(\mu \cdot n) \quad (3)$$

Figure 5:
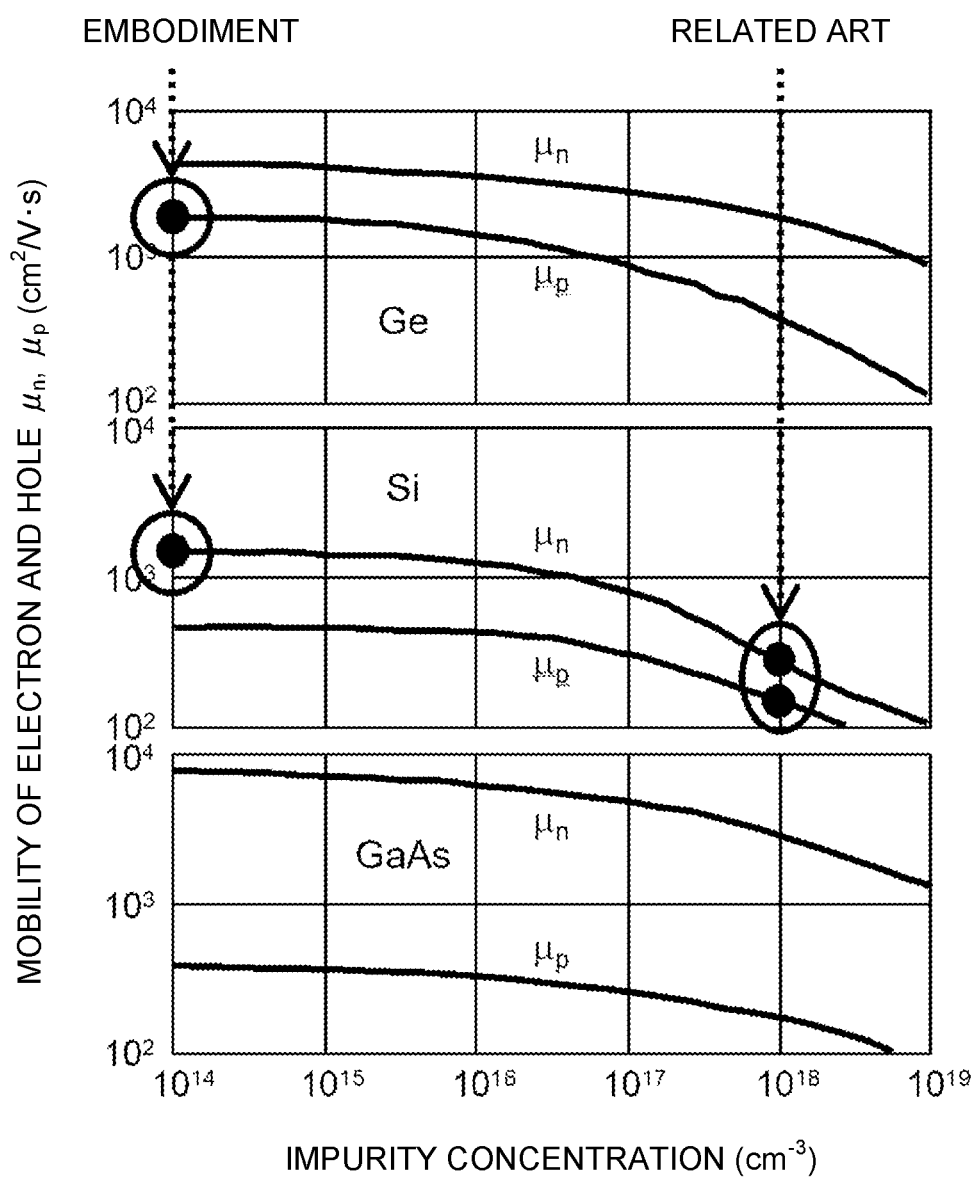
FIG. 5 is a diagram illustrating a relationship between the mobility of Si, Ge, and GaAs and an impure substance concentration.

In the related art, if the doping density is increased in order to increase the carrier concentration n, ionized impurity scattering is increased and the mobility p is accordingly decreased. FIG. 5 is a diagram illustrating the relationship between the mobility of Si, Ge, and GaAs and the impure substance concentration. For example, in a case of implementing the band of 54 GHz, the doping density of $10^{18}$ cm$^{-3}$ is needed; however, the mobility p is decreased to less than half the mobility that is exhibited in an undoped case ($10^{14}$ cm$^{-3}$ or less).

In contrast, in the embodiment, electrons and holes that are free carriers are generated in an area that is isolated from ionized impurity (dopant), so that the electrons and the holes are not affected by ionized impurity scattering, and thus, it is possible to maintain the mobility that is exhibited in the undoped case. As a result, according to the embodiment, it is possible to further decrease the resistance value than the related art, and thus, the frequency band is expected to be increased up to 100 GHz that is doubled than before.

Figure 6:
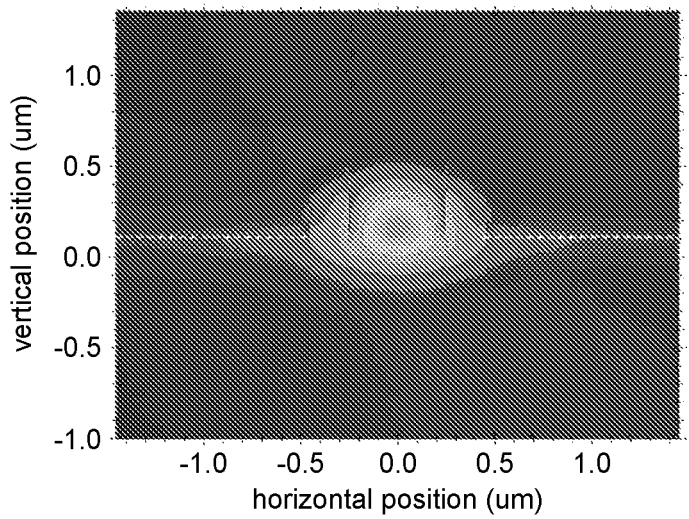
FIG. 6 is a diagram illustrating a simulation result of the electric field intensity of the optical modulation element according to the embodiment.
Figure 6:
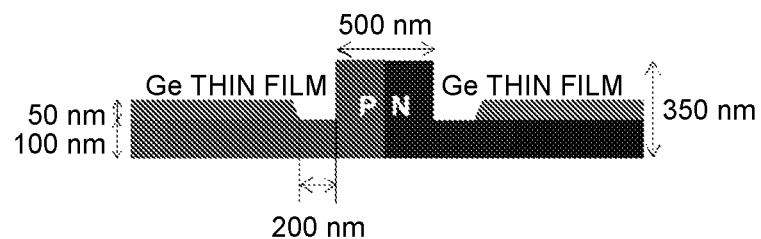

FIG. 6 is a diagram illustrating a simulation result of the electric field intensity of the optical modulation element 100 according to the embodiment. In the lower part of FIG. 6, the size of each of the part used in a simulation is illustrated. According to the embodiment, the optical modulation element 100 is able to confine the beam to the rib portion 112 of the core 110 and the vicinity of the rib portion 112, and furthermore, the optical modulation element 100 is able to obtain a favorable beam profile.

Figure 7:
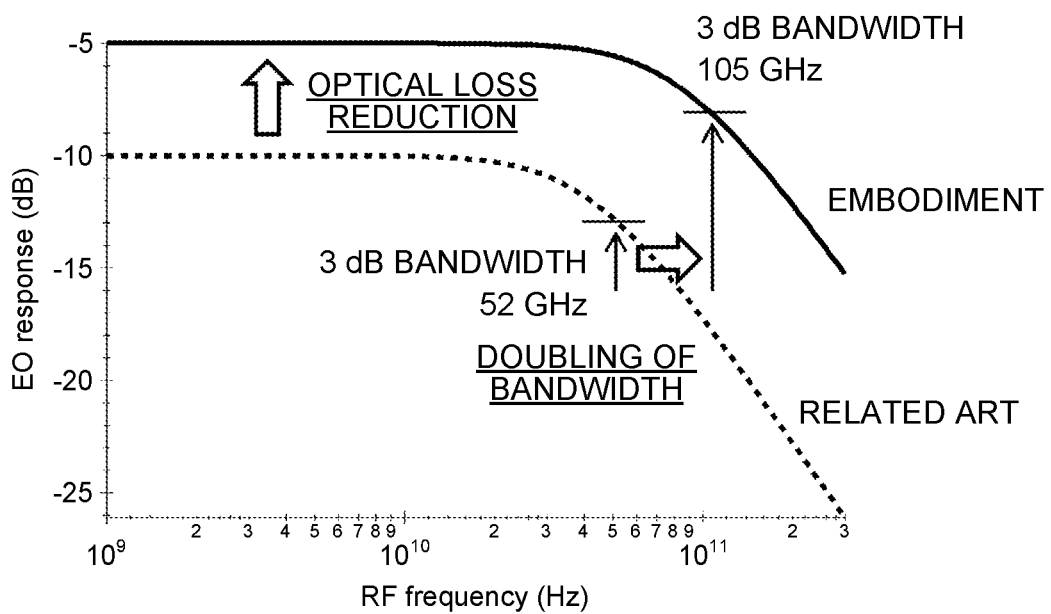
FIG. 7 is a simulation result of a Mach-Zehnder optical modulator using the optical modulation element according to the embodiment.

Although the use of the optical modulation element 100 is not particularly limited; however, it is possible to constitute an optical modulator by disposing two optical modulation elements at two arms of a Mach-Zehnder interferometer. FIG. 7 is a diagram illustrating a simulation result (solid line) of the frequency characteristics of the Mach-Zehnder optical modulator constituted by using the optical modulation element 100. In addition, for the purposes of comparison, a simulation result of the frequency characteristics of a modulator that is used in the related art and that has the same size as the Mach-Zehnder optical modulator according to the embodiment is indicated by the broken line.

The Mach-Zehnder optical modulator is configured by using the rib type waveguide included in the optical modulation element 100 as a phase modulating unit. The parameters of the simulation are as follows.

the size of the waveguide included in the phase modulating unit the width of the rib is 500 nm, the height of the rib is 340 nm, and the length of the waveguide is 3 mm an optical loss in the waveguide included in the phase modulating unit is set to 0.5 dB/mm.

Furthermore, an optical loss in the related art is assumed to be 1.0 dB/mm.

In the simulation, a numerical analysis is performed on the electric characteristics of an electric circuit composed of the series resistance R and the electrostatic capacity C, the obtained electric characteristics are input as the frequency characteristics of the phase modulating unit, and the frequency response of optical interference intensity is derived. The following values are used for the resistance R and the electrostatic capacity C.

the series resistance R: 1.7Ω for the embodiment, 3.5Ω for the related art the electrostatic capacity C: 1.2 pF (DC reverse bias of 3 V) for both of the embodiment and the related art As can be understood from this simulation result, the optical loss is improved by an amount of 5 dB from −10 dB that is indicated by the related optical loss to −5 dB that is indicated by the present embodiment. Furthermore, when comparing the band (−3 dB), the band is 52 GHz in the related art, whereas the band is 105 GHz in the present embodiment, that is, the band is increased up to about twice than before, which indicates that it is possible to perform a high speed operation.

In the above, the present invention has been described on the basis of the embodiment. The embodiment is only an example, various modifications in combinations of components and processing processes are possible, and furthermore, it should be understood for those skilled in the art that such modifications are within the present invention. In the following, such modifications will be described.

First Modification

Figure 8:
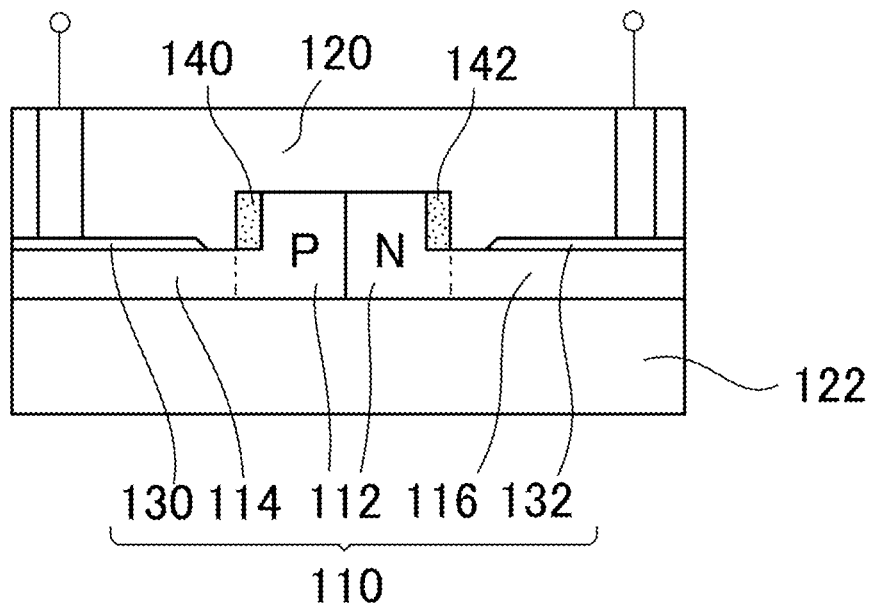
FIG. 8 is a sectional view of an optical modulation element according to a second modification.
Figure 9:
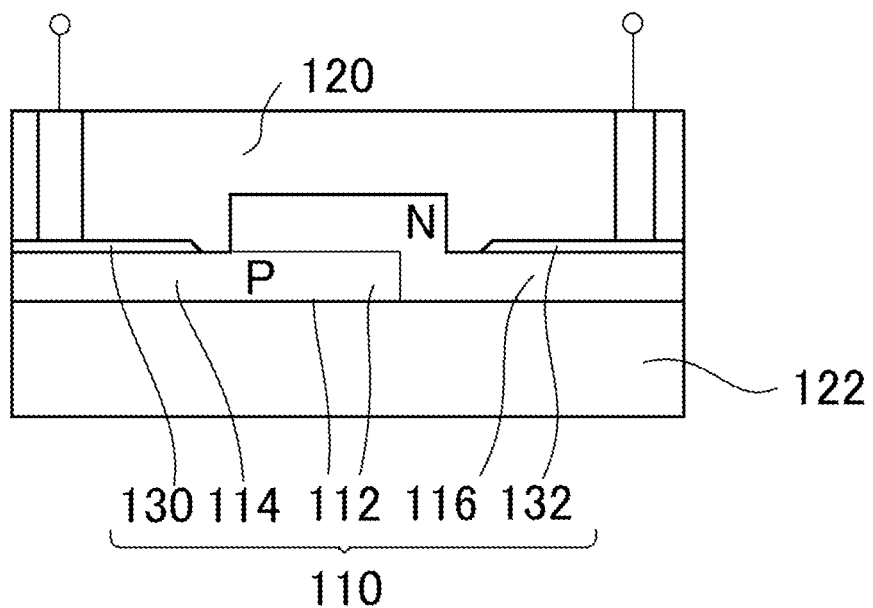
FIG. 9 is a sectional view of an optical modulation element according to a third modification.

In the embodiment, a case has been described as an example in which both of the first thin film 130 and the second thin film 132 are formed; however, the embodiment is not limited to this, and only the first thin film 130 may be formed, or only the second thin film 132 may be formed.
Second Modification FIG. 8 is a sectional view of an optical modulation element 100A according to a second modification. In this modification, impure substances are doped, at a low concentration, at shoulder portions 140 and 142 of the rib portion 112 (compensation dope).
Third Modification FIG. 9 is a sectional view of an optical modulation element 100B according to a third modification. In the embodiment, a description has been made of the P-N junction that has the horizontal structure; however, as illustrated in FIG. 9, the present invention is applicable to the P-N junction that has the vertical structure.
Fourth Modification In the embodiment, the Si waveguide has been described; however, the present invention is not limited to this and is applicable to a waveguide using another semiconductor material as a base. For example, it is possible to use a combination of compound semiconductors $GaAs/Al_{1-x}Ga_xAs$. A mixed crystal $Al_{1-x}Ga_xAs$ may be used as materials constituting the rib portion 112, the P-type slab area 114, and the N-type slab area 116, whereas a GaAs crystal may be used for the first thin film 130 and the second thin film 132. In this material system, the band arrangement corresponds to the hetero junction categorized in Type I, so that a 2DHG and a 2DEG are formed on the first thin film 130 and the second thin film 132, respectively. A composition ratio x may be set to, for example, 0.7. However, the composition ratio x is not limited to this value, and may be adjusted in accordance with a needed density of the 2DHG and the 2DEG, or in accordance with a request condition, such as an inhibited oxidation condition that is used after processing.

According to an aspect of an embodiment of the present invention, it is possible to implement an increase in a performance speed while preventing an increase in a loss.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulation element comprising:
a rib type optical waveguide that includes
a rib portion that has a P-N junction,
a P-type slab area that continuously extends from a P type area of the rib portion, and
an N-type slab area that continuously extends from an N type area of the rib portion; and
a first thin film that is formed on the P-type slab area, that is isolated from a dopant and that is made of a material having an electron affinity that is different from an electron affinity of the P-type slab area, a two-dimensional hold gas (2DHG) being formed in the first thin film.

2. The optical modulation element according to claim 1, wherein the first thin film is formed with a gap from a side wall of the rib portion.

3. The optical modulation element according to claim 1, further comprising a second thin film that is formed on the N-type slab area and that is made of a material having an electron affinity that is different from an electron affinity of the N-type slab area.

4. The optical modulation element according to claim 3, wherein the second thin film is formed with a gap from a side wall of the rib portion.

5. The optical modulation element according to claim 1, wherein the rib type optical waveguide includes Si, and the first thin film includes Ge.

* * * * *